US012124210B2

(12) United States Patent
Hatano

(10) Patent No.: US 12,124,210 B2
(45) **Date of Patent: *Oct. 22, 2024**

(54) DEVELOPING CARTRIDGE INCLUDING CASING, AND FIRST LEVER PIVOTALLY MOVABLE ABOUT SHAFT THEREOF RELATIVE TO CASING

(71) Applicant: BROTHER KOGYO KABUSHIKI KAISHA, Nagoya (JP)

(72) Inventor: Shuhei Hatano, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/448,418

(22) Filed: Aug. 11, 2023

(65) Prior Publication Data

US 2023/0384731 A1 Nov. 30, 2023

Related U.S. Application Data

(63) Continuation of application No. 18/048,908, filed on Oct. 24, 2022, now Pat. No. 11,774,903, which is a (Continued)

(30) Foreign Application Priority Data

Jan. 29, 2021 (JP) ................................ 2021-013612

(51) Int. Cl.

*G03G 21/16* (2006.01)
*G03G 15/08* (2006.01)
*G03G 21/18* (2006.01)

(52) U.S. Cl.

CPC ..... *G03G 21/1821* (2013.01); *G03G 15/0872* (2013.01); *G03G 21/1647* (2013.01); *G03G 21/1676* (2013.01)

(58) Field of Classification Search

CPC ........... G03G 15/0865; G03G 15/0872; G03G 21/1647; G03G 21/1676; G03G 21/1821

See application file for complete search history.

(56) References Cited

U.S. PATENT DOCUMENTS 11,513,467 B2 11/2022 Hatano
11,774,903 B2 * 10/2023 Hatano ............. G03G 15/0872 399/12

(Continued)

FOREIGN PATENT DOCUMENTS

JP 2013-054058 A 3/2013

*Primary Examiner* — Sophia S Chen
(74) *Attorney, Agent, or Firm* — Merchant & Gould P.C.

(57) ABSTRACT

A developing cartridge includes: a casing; a developing roller extending in a first direction; a boss movable with the casing; and a first lever movable relative to the casing. The first lever includes: one end portion functioning as a point of effort; another end portion functioning as a point of load; a shaft functions as a fulcrum and positioned between the one end portion and the another end portion; and a first hole into which the boss is fitted. By the one end portion receiving a driving force, the first lever is pivotally movable about the shaft. A dimension of the first hole in a second direction crossing the first direction is greater than a dimension in the second direction of the boss. In a case where the casing moves in the second direction relative to the first lever, the boss moves in the second direction within the first hole.

8 Claims, 12 Drawing Sheets

Related U.S. Application Data continuation of application No. 17/569,866, filed on Jan. 6, 2022, now Pat. No. 11,513,467.

(56) References Cited

U.S. PATENT DOCUMENTS

| | | | |
|---|---|---|---|
| 2012/0224885 | A1 | 9/2012 | Itabashi |
| 2013/0051849 | A1 | 2/2013 | Itabashi et al. |
| 2020/0310291 | A1 | 10/2020 | Itabashi |
| 2022/0171323 | A1 | 6/2022 | Hatano et al. |

* cited by examiner

DEVELOPING CARTRIDGE INCLUDING CASING, AND FIRST LEVER PIVOTALLY MOVABLE ABOUT SHAFT THEREOF RELATIVE TO CASING

CROSS REFERENCE TO RELATED APPLICATIONS

This application is a continuation of U.S. patent application Ser. No. 18/048,908, filed Oct. 24, 2022, now U.S. Pat. No. 11,774,903, which is a continuation of U.S. patent application Ser. No. 17/569,866, filed Jan. 6, 2022, now U.S. Pat. No. 11,513,467, which claims priority from Japanese Patent Application No. 2021-013612 filed Jan. 29, 2021. The entire content of the aforementioned applications is incorporated herein by reference.

BACKGROUND

There has been conventionally known an image forming apparatus such as a laser printer or an LED printer. A developing cartridge is used with image forming apparatus. The developing cartridge includes a developing roller for supplying developing agent. A prior art discloses a conventional image forming apparatus described above.

The developing cartridge disclosed in the prior art is attachable to a drum cartridge including a photosensitive drum. When the developing cartridge is attached to the drum cartridge, the photosensitive drum and the developing roller make contact with each other. Thereafter, the drum cartridge to which the developing cartridge is attached is attached to the image forming apparatus.

SUMMARY

In the image forming apparatus, a separation process for temporarily separating the developing roller from the photosensitive drum may be performed. Further, the developing cartridge may include a lever for receiving a driving force from image forming apparatus when the separation process is performed. In this case, the lever is movable relative to a casing of the developing cartridge. However, in a case where a range in which the lever is movable is too broad, there is a likelihood that positioning of the lever is difficult in a process of attachment of the developing cartridge to the drum cartridge.

In view of the foregoing, it is an object of the present disclosure to provide a developing cartridge in which a lever is movable relative to a casing and a movable range of the lever can be limited.

In order to attain the above and other objects, according to one aspect, the present disclosure provides a developing cartridge including: a casing; a developing roller; a boss; and a first lever. The casing is configured to accommodate developing agent therein. The developing roller extends in a first direction. The developing roller is positioned at one end in a second direction of the casing. The second direction crosses the first direction. The boss extends in the first direction and is movable together with the casing. The first lever is movable relative to the casing. The first lever includes: one end portion which is one end portion of the first lever; another end portion which is another end portion of the first lever; a shaft; and a first hole into which the boss is fitted. The one end portion functions as a point of effort. The another end portion functions as a point of load. The shaft is positioned between the one end portion and the another end portion. The shaft functions as a fulcrum. By the one end portion receiving a driving force, the first lever is pivotally movable about the shaft. A dimension in the second direction of the first hole is greater than a dimension in the second direction of the boss. In a case where the casing moves in the second direction relative to the first lever, the boss moves in the second direction within the first hole.

With the above configuration, by fitting engagement of the boss into the first hole, the casing is movable in the second direction relative to the first lever while limiting a movable range of the first lever relative to the casing.

BRIEF DESCRIPTION OF THE DRAWINGS

The particular features and advantages of the embodiment(s) as well as other objects will become apparent from the following description taken in connection with the accompanying drawings, in which.

DETAILED DESCRIPTION

Hereinafter, one embodiment of the present disclosure will be described while referring to the accompanying drawings.

In the following description, a direction in which a developing roller extends will be referred to as "first direction". Further, a direction in which one end of a casing at which the developing roller is positioned and another end of the casing are arranged will be referred to as "second direction". The first direction and the second direction cross each other. Also, the first direction and the second direction may be perpendicular to each other.

<1. Overview of Developing Cartridge and Drum Cartridge>

Figure 1:
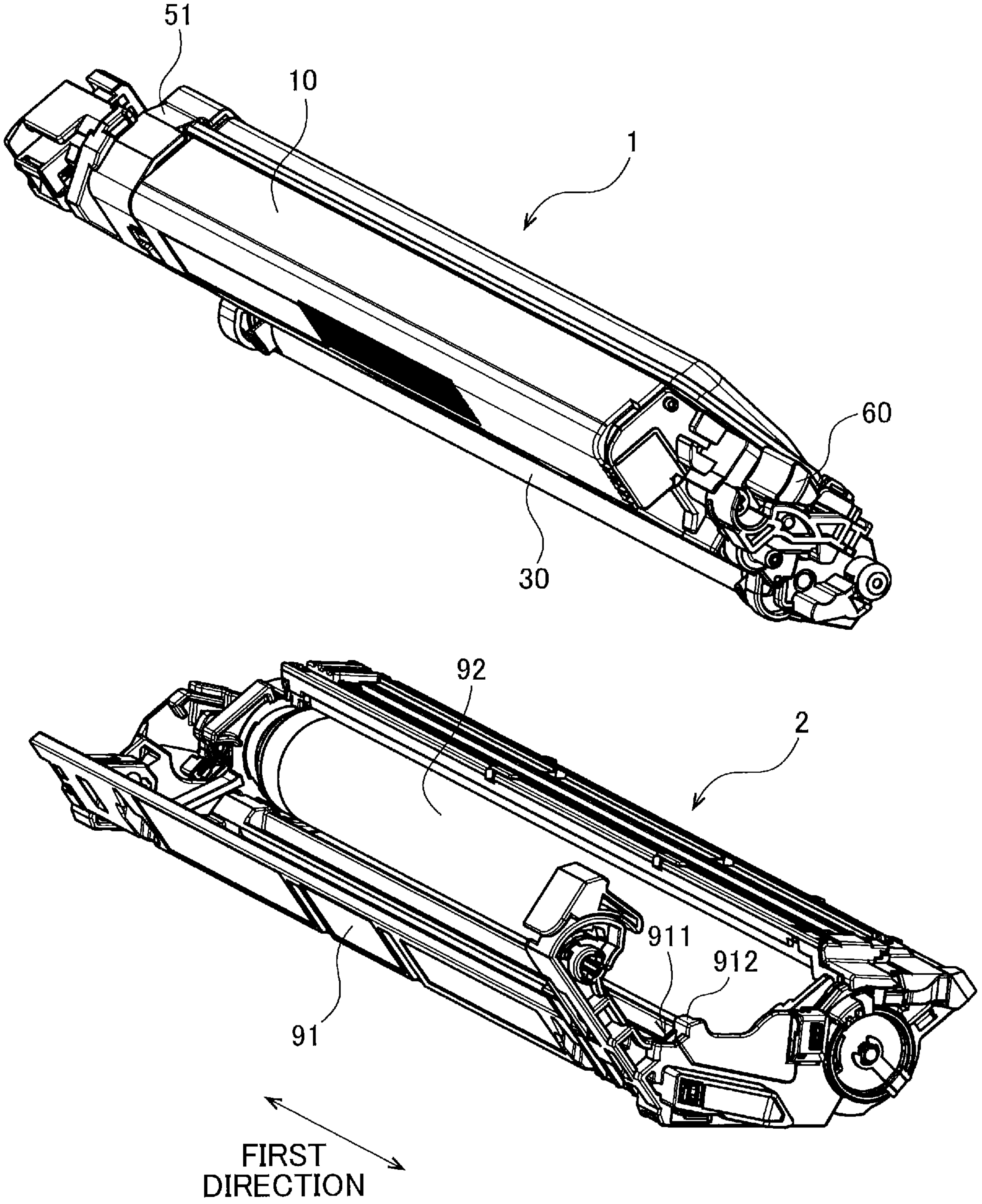
FIG. 1 is a perspective view of a developing cartridge and a drum cartridge.

FIG. 1 is a perspective view of a developing cartridge 1 and a drum cartridge 2. The developing cartridge 1 and the drum cartridge 2 are for use with an electro-photographic image forming apparatus such as a laser printer or an LED printer.

As illustrated in FIG. 1, the developing cartridge 1 is used with the drum cartridge 2 including a photosensitive drum 92. The developing cartridge 1 is attachable to the drum cartridge 2. Further, the developing cartridge 1 is attachable to the image forming apparatus in a state where the developing cartridge 1 is attached to the drum cartridge 2. Four of the developing cartridges 1 are attachable to the image forming apparatus, for example.

Each of the four developing cartridges 1 accommodates therein developing agent of color different from one another (for example, cyan, magenta, yellow, and black). The developing agent is, for example, toner. The image forming apparatus is configured to form an image on a surface of a printing sheet using the developing agent supplied from each of the developing cartridges 1. Note that the number of developing cartridges 1 attachable to the image forming apparatus may be one to three, or more than five.

<2. Developing Cartridge>

Figure 2:
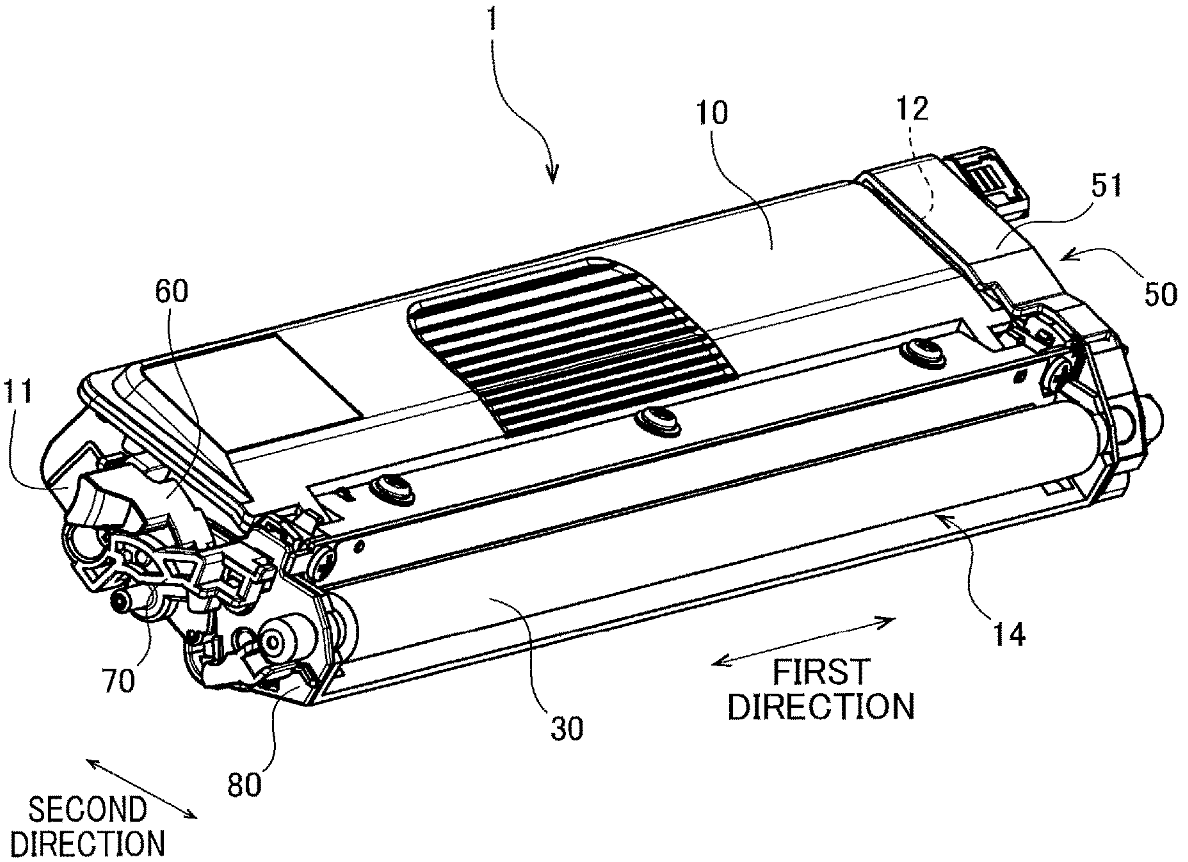
FIG. 2 is a perspective view of the developing cartridge.
Figure 3:
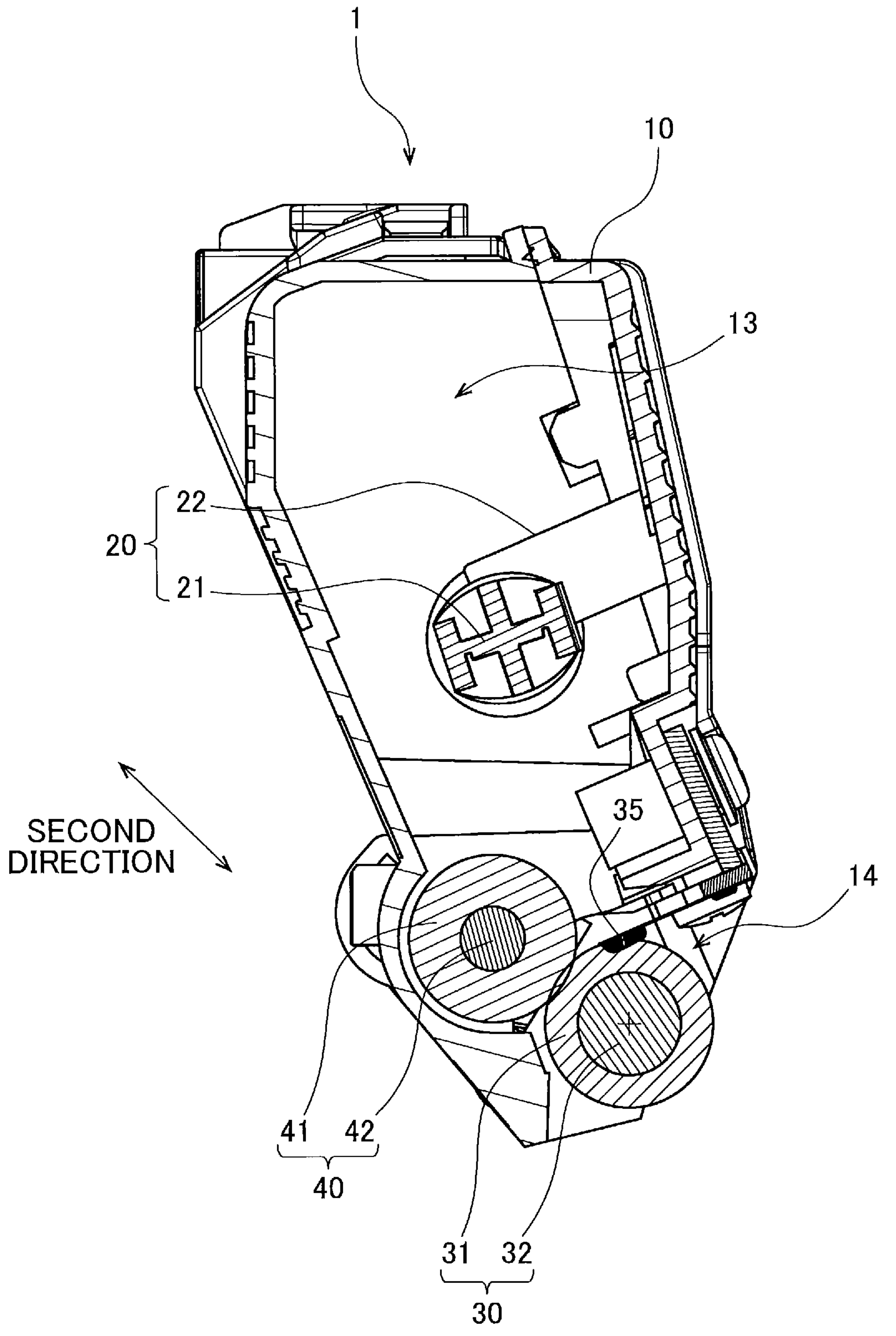
FIG. 3 is a cross-sectional view of the developing cartridge.
Figure 4:
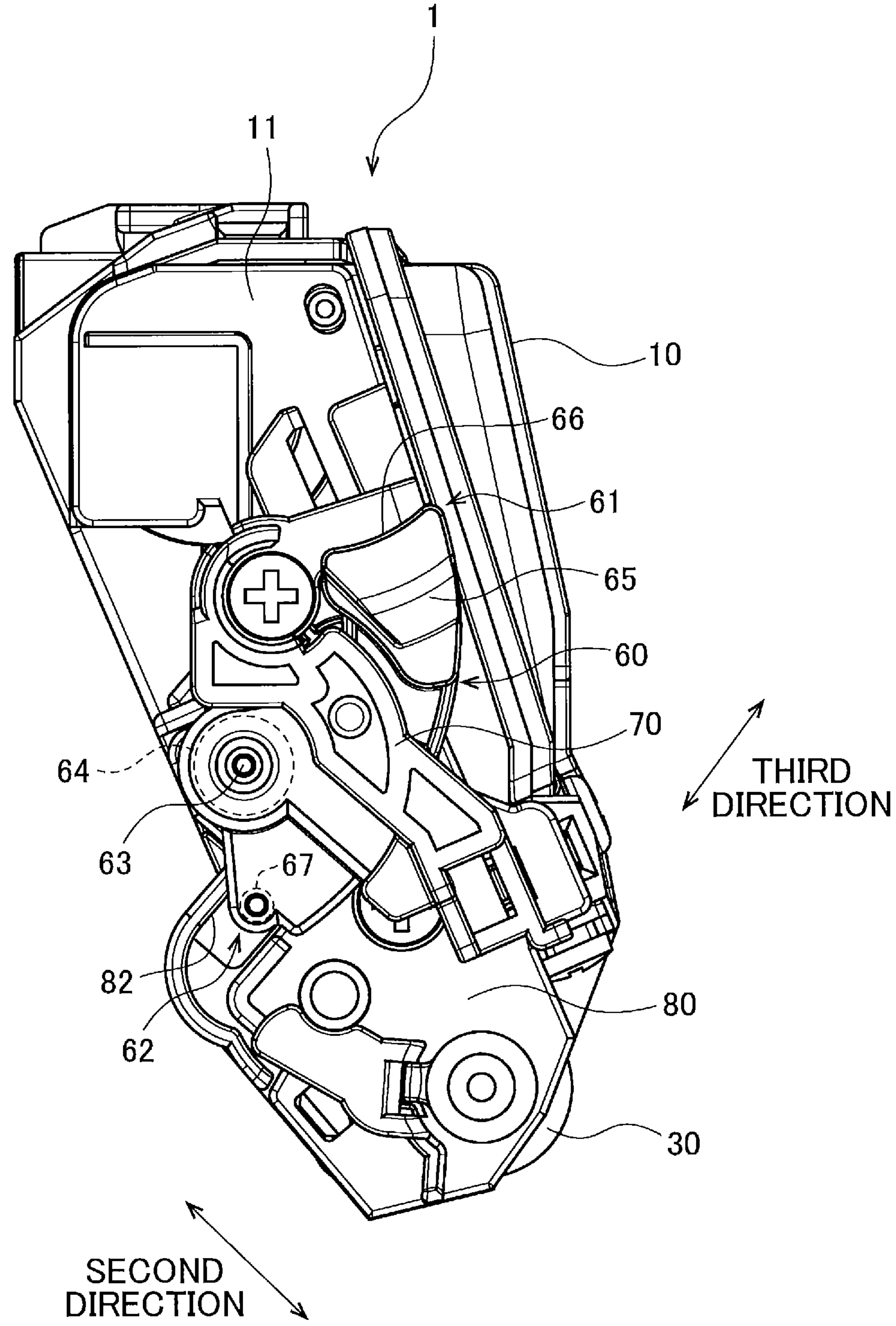
FIG. 4 is a side view of the developing cartridge as viewed from a side in which a first outer surface is positioned.

FIG. 2 is a perspective view of the developing cartridge 1. FIG. 3 is a cross-sectional view of the developing cartridge 1 taken along a plane perpendicular to the first direction. FIG. 4 is a view of the developing cartridge 1 as viewed from a side at which a first outer surface 11 (described later) is positioned. As illustrated in FIGS. 2 to 4, the developing cartridge 1 includes a casing 10, an agitator 20, a developing roller 30, a supply roller 40, a gear portion 50, and a first lever 60.

The casing 10 is a container configured to accommodate therein developing agent. The casing 10 has the first outer surface 11 and a second outer surface 12. The first outer surface 11 is positioned at one end in the first direction of the casing 10, whereas the second outer surface 12 is positioned at another end in the first direction of the casing 10. The first outer surface 11 and the second outer surface 12 are spaced apart from each other in the first direction. The casing 10 extends in the first direction between the first outer surface 11 and the second outer surface 12, and also extends in the second direction.

An accommodation chamber 13 is provided inside the casing 10. The developing agent is accommodated in the accommodation chamber 13. In the meantime, the casing 10 has an opening 14 positioned at one end in the second direction of the casing 10. The opening 14 allows the accommodation chamber 13 to be in communication with an outside of the casing 10 therethrough. Note that the casing 10 may include a handle at an outer surface positioned at another end in the second direction of the casing 10.

The agitator 20 includes an agitator shaft 21, and a fin 22. The agitator shaft 21 extends in the first direction. The fin 22 extends from the agitator shaft 21 toward an inner surface of the casing 10. In other words, the fin 22 extends radially outward of the agitator shaft 21. The fin 22 and a portion of the agitator shaft 21 are positioned inside the accommodation chamber 13 of the casing 10.

One end in the first direction of the agitator shaft 21 is fixed to an agitator gear included in the gear portion 50. As the agitator gear rotates, both the agitator shaft 21 and the fin 22 rotate about a rotation axis extending in the first direction. Accordingly, the developing agent in the accommodation chamber 13 is agitated by rotation of the fin 22.

The developing roller 30 is a roller rotatable about a rotation axis extending in the first direction. The developing roller 30 is positioned at the opening 14 of the casing 10. That is, the developing roller 30 is positioned at the one end in the second direction of the casing 10. The developing roller 30 includes a developing roller body 31, and a developing roller shaft 32. The developing roller body 31 is a hollow cylindrical member that extends in the first direction. The developing roller body 31 is formed of, for example, rubber having elasticity. The developing roller shaft 32 is a solid cylindrical member. The developing roller shaft 32 extends in the first direction to penetrate the developing roller body 31 in the first direction. The developing roller body 31 is fixed relative to the developing roller shaft 32. The developing roller shaft 32 is a member having an electrical conductivity. The developing roller shaft 32 is formed of metal or electrically conductive resin.

The developing cartridge 1 further includes a bearing 80. The bearing 80 is positioned at the first outer surface 11 of the casing 10. The bearing 80 has a plate-like shape and expands along the first outer surface 11. The bearing 80 is a member having an electrical conductivity. The bearing 80 is made of metal or electrically conductive resin.

The developing roller shaft 32 has one end in the first direction supported by the bearing 80. Specifically, the one end in the first direction of the developing roller shaft 32 is inserted into a first through-hole (not illustrated) formed in the bearing 80 and makes contact with the bearing 80. Accordingly, the developing roller shaft 32 is electrically connected to the bearing 80.

When the drum cartridge 2 to which the developing cartridge 1 is attached is attached to the image forming apparatus, the image forming apparatus supplies a bias voltage to the developing roller shaft 32 via the bearing 80. As a result, the developing agent is carried onto an outer circumferential surface of the developing roller body 31 due to an electrostatic force generated between the developing roller shaft 32 and the developing agent.

The developing roller shaft 32 has another end in the first direction fixed to a developing roller gear included in the gear portion 50. As the developing roller gear rotates, the developing roller shaft 32 also rotates to cause the developing roller body 31 to rotate together with the developing roller shaft 32.

Note that the developing roller shaft 32 may not penetrate the developing roller body 31 in the first direction. Alternatively, two developing roller shaft 32 may extend from both ends in the first direction of the developing roller body 31 in the first direction, respectively.

The supply roller 40 is a roller rotatable about a rotation axis extending in the first direction. The supply roller 40 is positioned between the agitator 20 and the developing roller 30. The supply roller 40 includes a supply roller body 41, and a supply roller shaft 42. The supply roller body 41 is a hollow cylindrical member extending in the first direction. The supply roller body 41 is made of, for example, rubber having elasticity. The supply roller shaft 42 is a solid cylindrical member that extends in the first direction and penetrates the supply roller body 41 in the first direction. The supply roller body 41 is fixed relative to the supply roller shaft 42. The supply roller shaft 42 has an electrical conductivity. The supply roller shaft 42 is made of metal or electrically conductive resin.

The supply roller shaft 42 has one end in the first direction supported by the bearing 80. Specifically, the one end in the first direction of the supply roller shaft 42 is inserted into a second through-hole (not illustrated) formed in the bearing 80. Also, the one end in the first direction of the supply roller shaft 42 makes contact with the bearing 80, thereby establishing electrical connection between the supply roller shaft 42 and the bearing 80.

When the drum cartridge 2 to which the developing cartridge 1 is attached is attached to the image forming apparatus, the image forming apparatus supplies a bias voltage to the supply roller shaft 42 via the bearing 80. Accordingly, the developing agent is carried on to an outer circumferential surface of the supply roller body 41 by virtue of an electrostatic force generated between the supply roller shaft 42 and the developing agent.

The supply roller shaft 42 has another end in the first direction fixed to a supply roller gear included in the gear portion 50. With this configuration, rotation of the supply roller gear causes the supply roller shaft 42 to rotate, whereby the supply roller body 41 also rotates together with the supply roller shaft 42.

Note that the supply roller shaft 42 may not penetrate the supply roller body 41 in the first direction. Alternatively, two supply roller shaft 42 may extend in the first direction from both ends in the first direction of the supply roller body 41, respectively.

The outer circumferential surface of the supply roller body 41 and the outer circumferential surface of the developing roller body 31 make contact with each other. The developing agent accommodated in the casing 10 is supplied to the developing roller 30 through the supply roller 40. In the meantime, the developing cartridge 1 also includes a layer-thickness regulation blade 35. The layer-thickness regulation blade 35 is configured to regulate a layer of the developing agent carried on the circumferential surface of the developing roller body 31 so that the layer has a constant thickness.

Thereafter, the developing agent on the outer circumferential surface of the developing roller body 31 is supplied to the photosensitive drum 92 (described later) of the drum cartridge 2. At this time, the developing agent moves from the outer circumferential surface of the developing roller body 31 to the photosensitive drum 92 in accordance with an electrostatic latent image formed on an outer circumferential surface of the photosensitive drum 92. As a result, the electrostatic latent image becomes a visible image on the outer circumferential surface of the photosensitive drum 92.

The gear portion 50 is positioned at the second outer surface 12 of the casing 10. The gear portion 50 includes a gear cover 51, a coupling, and a plurality of gears. The gear cover 51 constitutes a housing of the developing cartridge 1 together with the casing 10. The gear cover 51 is fixed to the second outer surface 12 of the casing 10. The plurality of gears include the agitator gear, the developing roller gear, and the supply roller gear those are described earlier. At least a part of the plurality of gears is positioned in a space between the second outer surface 12 and the gear cover 51.

The coupling is exposed to an outside of the gear cover 51. When the drum cartridge 2 to which the developing cartridge 1 is attached is attached to the image forming apparatus, a drive shaft of the image forming apparatus is coupled to the coupling of the developing cartridge 1. Rotation of the drive shaft is transmitted to the agitator gear, the developing roller gear, and the supply roller gear through the coupling.

Note that the plurality of gears included in the gear portion 50 may transmit a rotation force due to meshing engagement between teeth of the gears, or may transmit a rotation force by a frictional force generated between the gears.

The first lever 60 is positioned at the first outer surface 11 of the casing 10. The first lever 60 is positioned away from the developing roller 30 in the second direction. The first lever 60 is movable relative to the casing 10.

Figure 5:
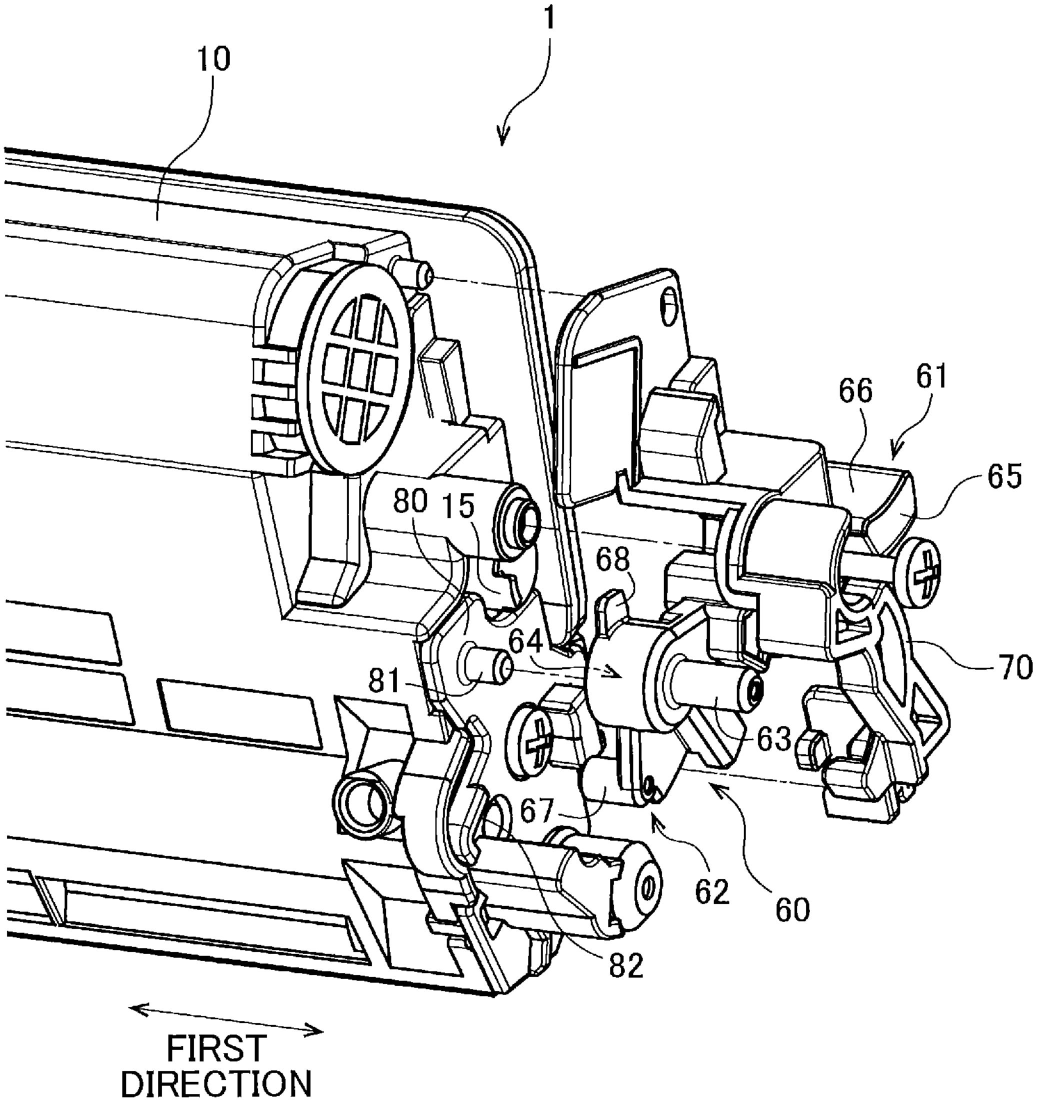
FIG. 5 is an exploded perspective view of a portion of the developing cartridge in the vicinity of the first outer surface.
Figure 6:
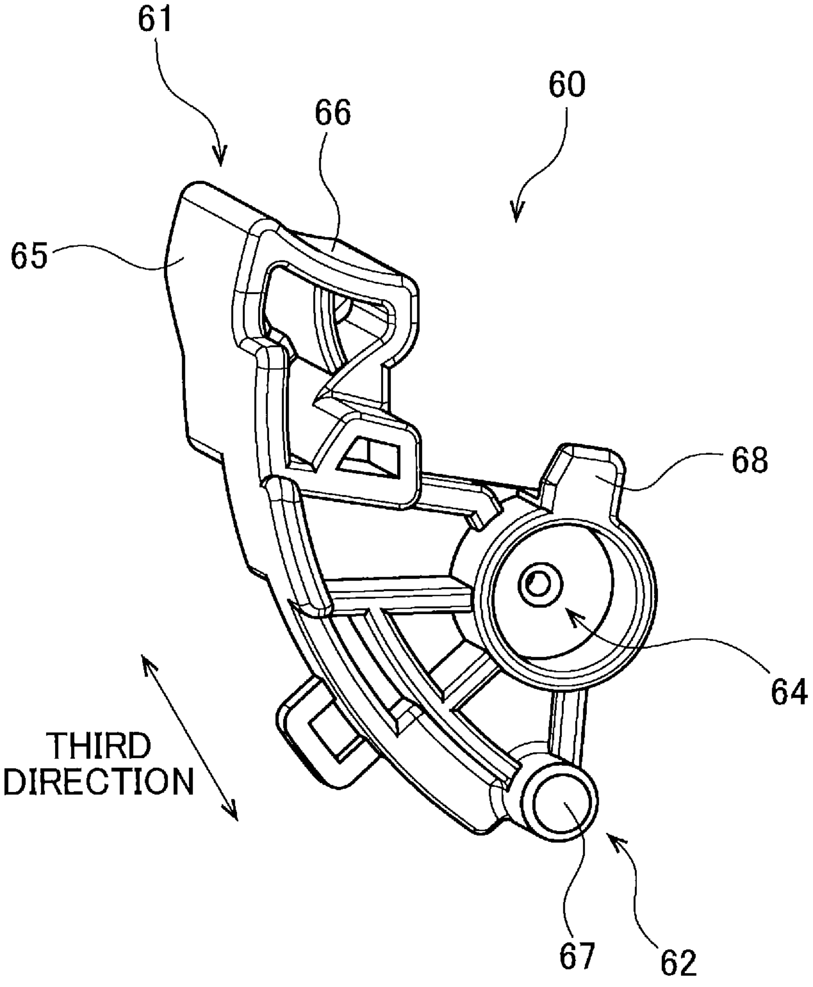
FIG. 6 is a perspective view of a first lever of the developing cartridge.

FIG. 5 is an exploded perspective view of a portion in the vicinity of the first outer surface 11 of the developing cartridge 1. FIG. 6 is a perspective view of the first lever 60.

As illustrated in FIGS. 4 to 6, the first lever 60 includes one end portion 61, another end portion 62, and a shaft 63, and has a first hole 64. The one end portion 61 is positioned at one end of the first lever 60 in a third direction crossing both the first direction and the second direction. The other end portion 62 is positioned at another end in the third direction of the first lever 60. The one end portion 61 and the other end portion 62 are positioned away from each other in the third direction.

The one end portion 61 of the first lever 60 includes a first protrusion 65. The first protrusion 65 protrudes in the first direction at the one end portion 61. Further, the first protrusion 65 protrudes in a direction away from the first outer surface 11 of the casing 10 at the one end portion 61. The first protrusion 65 has a recessed surface 66. In a state where the developing cartridge 1 is attached to the drum cartridge 2, the recessed surface 66 is recessed toward the photosensitive drum 92 (described later) of the drum cartridge 2.

The other end portion 62 of the first lever 60 includes a second protrusion 67. The second protrusion 67 protrudes in the first direction at the other end portion 62. Specifically, the other end portion 62 protrudes in a direction toward the first outer surface 11 of the first outer surface 11 at the other end portion 62.

The shaft 63 is positioned between the one end portion 61 and the other end portion 62 in the third direction. The shaft 63 protrudes in the first direction from the first lever 60. Also, the shaft 63 protrudes in a direction away from the first outer surface 11 of the first outer surface 11. In the state where the developing cartridge 1 is attached to the drum cartridge 2, the shaft 63 is configured to make contact with a drum frame 91 (described later) of the drum cartridge 2. The first lever 60 is pivotally movable about the shaft 63 between a first position and a second position.

As illustrated in FIGS. 4 and 5, the bearing 80 has a pressure-receiving surface 82. The pressure-receiving surface 82 is positioned farther away from the developing roller 30 than the other end portion 62 of the first lever 60 is from the developing roller 30. The pressure-receiving surface 82 faces the other end portion 62 of the first lever 60 in the second direction. Specifically, the pressure-receiving surface 82 faces the second protrusion 67 of the first lever 60 in the second direction.

When the one end portion 61 receives a driving force from the image forming apparatus in the state where the developing cartridge 1 is attached to the drum cartridge 2, the first lever 60 pivotally moves about the shaft 63. As a result of pivotal movement of the first lever 60, the other end portion 62 of the first lever 60 is brought into contact with the pressure-receiving surface 82. At this time, the shaft 63 of the first lever 60 functions as a fulcrum, the one end portion 61 of the first lever 60 functions as a point of effort, and the other end portion 62 of the first lever 60 functions as a point of load.

The first hole 64 is positioned between the one end portion 61 and the other end portion 62 in the third direction. The first hole 64 overlaps the shaft 63 in the first direction. The first hole 64 is recessed in the first direction toward the shaft 63 from a surface of the first lever 60 facing the casing 10. The shaft 63 has a circular shape centered on an axis extending in the first direction in the present embodiment. However, the first hole 64 may have a shape other than a circular shape, such as an oval shape or a polygon shape.

As illustrated in FIG. 5, the bearing 80 includes a boss 81. The boss 81 extends in the first direction toward the first lever 60 from a surface of the bearing 80 facing the first lever

60. The bearing 80 is fixed to the casing 10. Therefore, the boss 81 is movable together with the casing 10.

The boss 81 is fitted into the first hole 64 of the first lever 60. The first hole 64 has an inner dimension greater than an outer dimension of the boss 81. That is, a dimension (an inner dimension) in the second direction of the first hole 64 is greater than a dimension (an outer dimension) in the second direction of the boss 81. Further, a dimension (an inner dimension) in the third direction of the first hole 64 is greater than a dimension (an outer dimension) in the third direction of the boss 81. Accordingly, the first hole 64 is movable relative to the boss 81 in the second direction and in the third direction. That is, the first lever 60 is movable relative to the bearing 80 and the casing 10 in the second direction and in the third direction within a range of difference in the dimensions between the boss 81 and the first hole 64.

As illustrated in FIGS. 5 and 6, the first lever 60 further includes a protrusion 68. The protrusion 68 protrudes from a periphery of the first hole 64 toward the other end in the second direction of the casing 10. In the meantime, the casing 10 has a pressing surface 15 as illustrated in FIG. 5. The protrusion 68 and the pressing surface 15 face each other in a pivot direction of the casing 10 in which the casing 10 pivotally moves about the developing roller 30.

The developing cartridge 1 also includes a lever holder 70. The lever holder 70 is positioned at the first outer surface 11 of the casing 10. Specifically, the lever holder 70 is fixed to the first outer surface 11 of the casing 10. The lever holder 70 covers a part of the first lever 60. That is, a part of the first lever 60 is positioned between the first outer surface 11 and the lever holder 70. Further, the lever holder 70 is positioned between the first protrusion 65 and the second protrusion 67 of the first lever 60 in the third direction.

The first protrusion 65 and the lever holder 70 face each other, thereby enabling the first protrusion 65 and the lever holder 70 to make contact with each other. Contact between the lever holder 70 and the first protrusion 65 can suppress detachment in the third direction of the first lever 60 from the lever holder 70. The lever holder 70 supports the first lever 60 such that the first lever 60 is movable relative to the casing 10.

<3. Drum Cartridge>

Next, the drum cartridge 2 will be described in detail.

As illustrated in FIG. 1, the drum cartridge 2 includes the drum frame 91 and the photosensitive drum 92. The developing cartridge 1 is attachable to the drum frame 91. The photosensitive drum 92 is a hollow cylindrical member rotatable about a rotation axis extending in the first direction. The outer circumferential surface of the photosensitive drum 92 is coated with photosensitive material. The photosensitive drum 92 is positioned at one end in the second direction of the drum frame 91.

Upon attachment of the developing cartridge 1 to the drum frame 91, the outer circumferential surface of the developing roller 30 is brought into contact with the outer circumferential surface of the photosensitive drum 92. At this time, the developing roller 30 is pressed toward the photosensitive drum 92 in the second direction due to an elastic member (not illustrated) provided at the drum cartridge 2.

Figure 7:
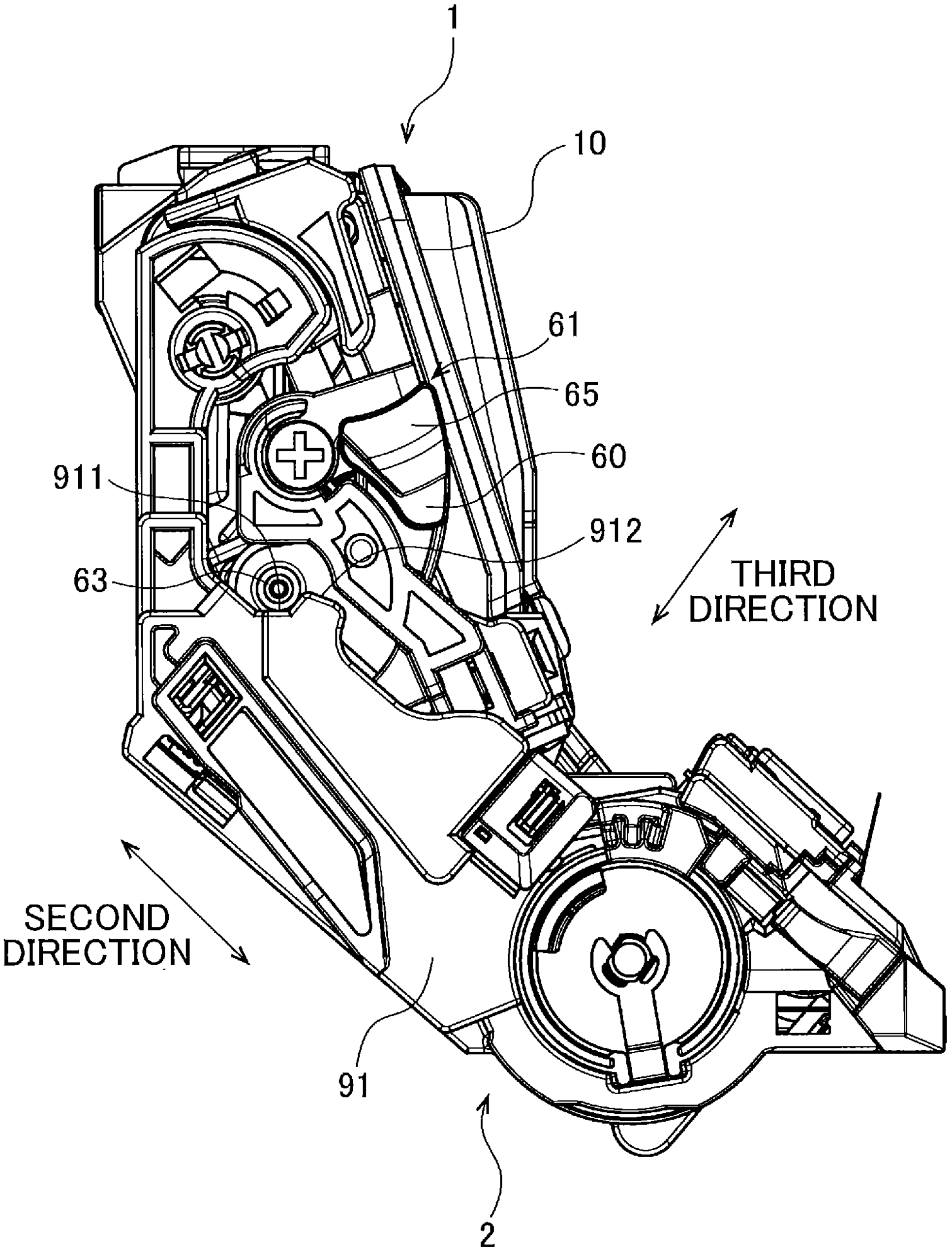
FIG. 7 is a view of the developing cartridge and the drum cartridge as viewed in a first direction.

FIG. 7 is a view of the developing cartridge 1 and the drum cartridge 2 as viewed in the first direction. As illustrated in FIGS. 1 and 7, the drum frame 91 has a recessed portion 911. The recessed portion 911 is positioned at one end in the first direction of the drum frame 91, and is recessed in the second direction toward the photosensitive drum 92. In a case where the developing cartridge 1 is attached to the drum cartridge 2, the shaft 63 of the first lever 60 is fitted into the recessed portion 911, and makes contact with the recessed portion 911 in a direction toward the photosensitive drum 92.

As illustrated in FIG. 7, the drum frame 91 also has a guide surface 912. The guide surface 912 is positioned at the one end in the first direction of the drum frame 91. Further, the guide surface 912 is positioned adjacent to the recessed portion 911. The guide surface 912 is inclined relative to the pivot direction of the casing 10 about the developing roller 30. During an attachment process of the developing cartridge 1 to the drum cartridge 2, the guide surface 912 guides the shaft 63 of the first lever 60 toward the recessed portion 911.

<4. Attachment Process of Developing Cartridge>

Figure 8:
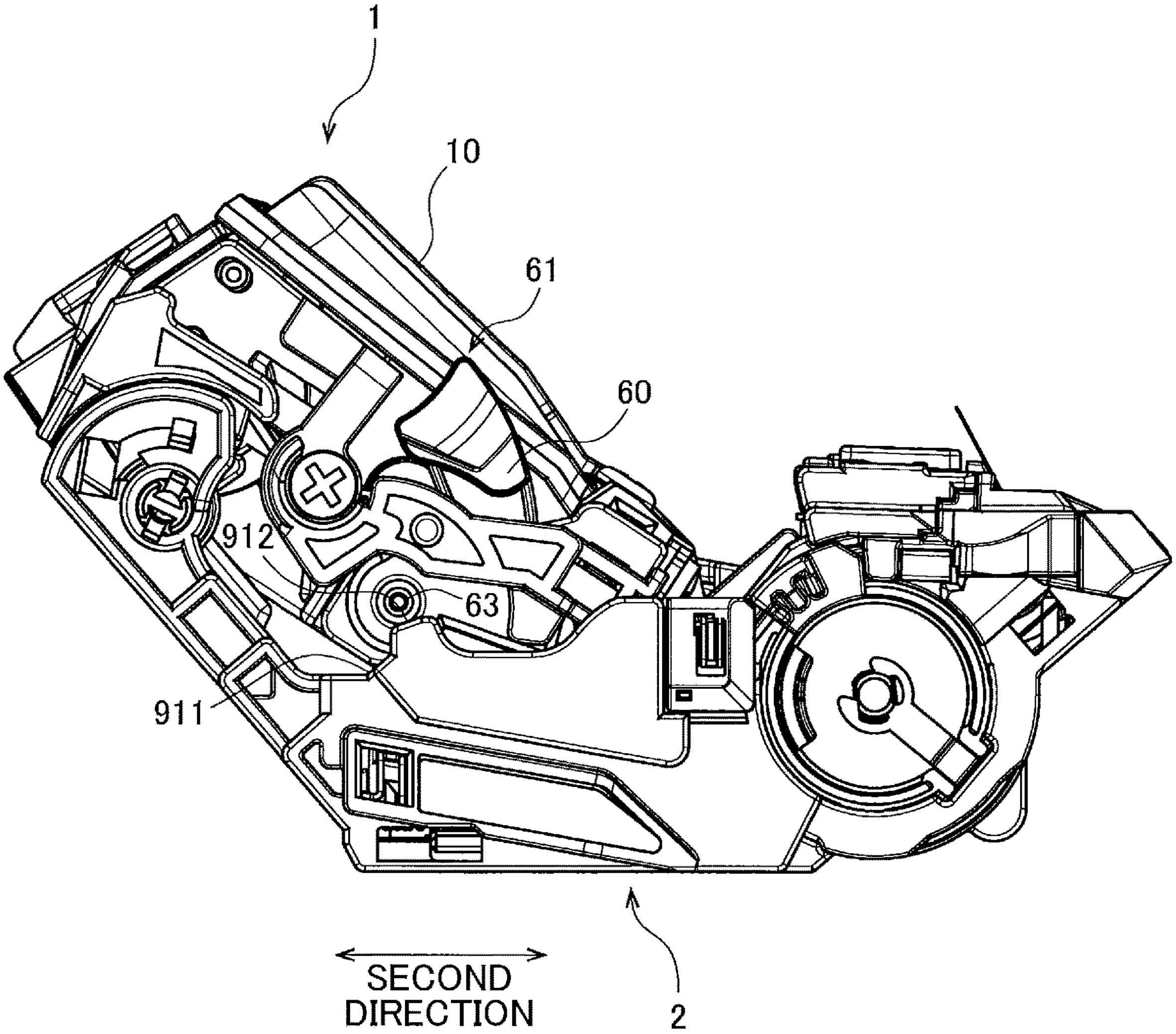
FIG. 8 is a view illustrating a state in a process of attachment of the developing cartridge to the drum cartridge as viewed in the first direction.
Figure 9:
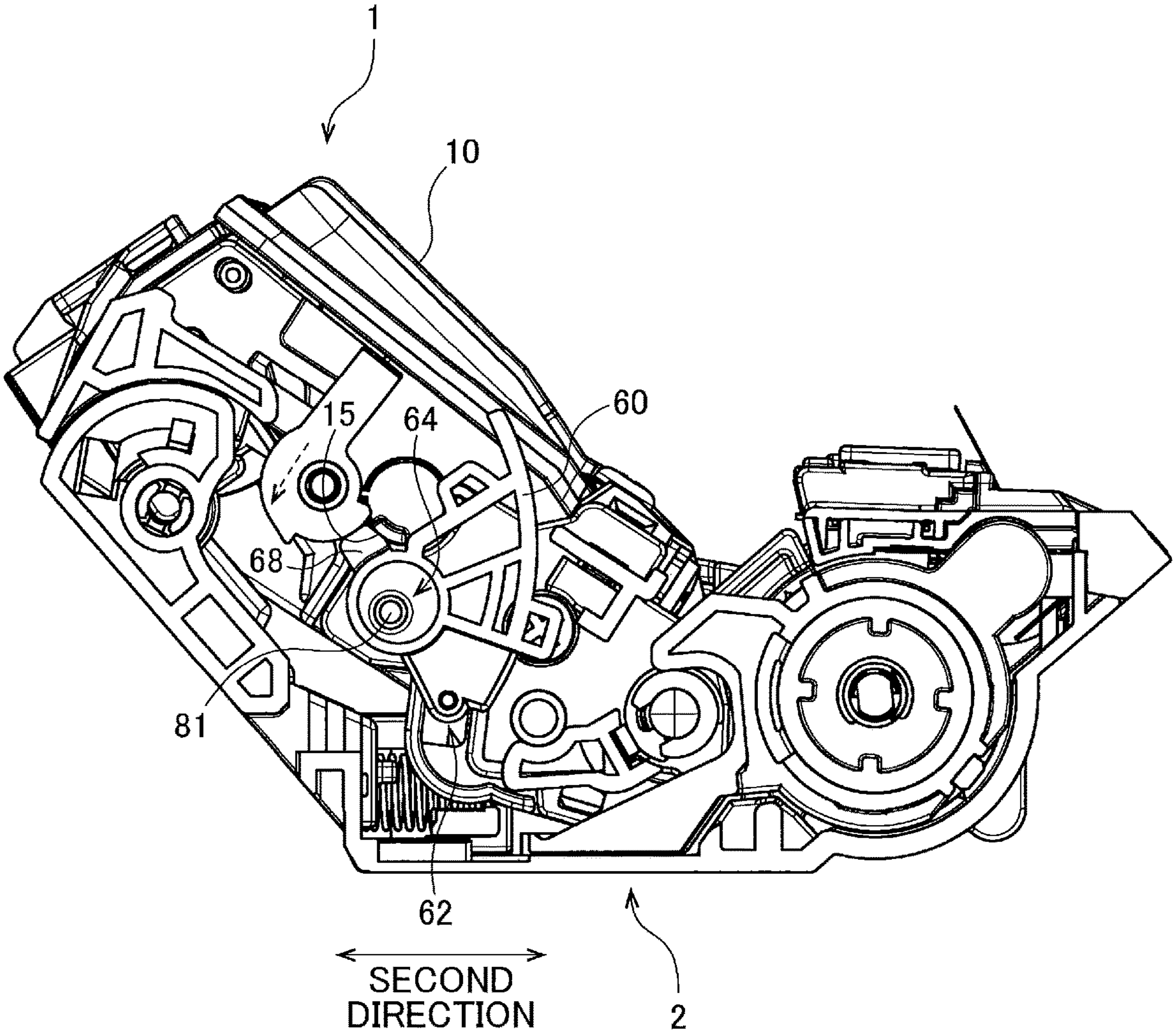
FIG. 9 is a cross-sectional view of the developing cartridge and the drum cartridge of FIG. 8.

FIG. 8 is a view of the developing cartridge 1 in a process of attachment to the drum cartridge 2 as viewed in the first direction. FIG. 9 is a cross-sectional view of the developing cartridge 1 and the drum cartridge 2 illustrated in FIG. 8 taken along a plane perpendicular to the first direction.

During the attachment process of the developing cartridge 1 to the drum cartridge 2, the developing cartridge 1 moves relative to the drum cartridge 2. Accordingly, the developing roller 30 approaches the photosensitive drum 92. At this time, the shaft 63 of the first lever 60 makes contact with the guide surface 912 of the drum frame 91 as illustrated in FIG. 8. Then, the outer circumferential surface of the developing roller 30 makes contact with the outer circumferential surface of the photosensitive drum 92 while the shaft 63 is in contact with the guide surface 912.

Thereafter, the casing 10 pivotally moves about the developing roller 30 as indicated by a broken arrow in FIG. 9 while the developing roller 30 maintains contact with the photosensitive drum 92. Specifically, the casing 10 pivotally moves in a direction approaching the drum frame 91 about the developing roller 30. At the same time, the pressing surface 15 of the casing 10 makes contact with the protrusion 68 of the first lever 60 as illustrated in FIG. 9, and presses the protrusion 68 toward the recessed portion 911 in accordance with the pivotal movement of the casing 10. Accordingly, the shaft 63 of the first lever 60 moves toward the recessed portion 911 along the guide surface 912, whereby the shaft 63 is positioned inside the recessed portion 911 as illustrated in FIG. 7.

As described above, with a configuration according to the present embodiment, during the attachment process of the developing cartridge 1 to the drum cartridge 2, the pressing surface 15 of the casing 10 presses the protrusion 68, thereby placing the shaft 63 of the first lever 60 into the recessed portion 911. Further, the shaft 63 is guided toward the recessed portion 911 along the guide surface 912 of the drum frame 91. Accordingly, the shaft 63 of the first lever 60 can be positioned within the recessed portion 911 with high accuracy.

Further, with the configuration according to the present embodiment, the boss 81 of the bearing 80 is fitted into the first hole 64 of the first lever 60. Accordingly, a range in which the first lever 60 is movable relative to the casing 10 is restricted. With the above configuration, during the attachment process of the developing cartridge 1 to the drum cartridge 2, the shaft 63 of the first lever 60 can securely make contact with the guide surface 912 of the drum frame 91.

Further, the shaft 63 and the first hole 64 overlap each other in the first direction. Accordingly, the movable range of the first lever 60 (particularly, the movable range of the shaft 63) can be restricted by virtue of fitting engagement of the boss 81 into the first hole 64. As a result, the shaft 63 makes contact with the guide surface 912 more accurately in the process of attachment of the developing cartridge 1 to the drum cartridge 2.

<5. Separation Process>

After the developing cartridge 1 is attached to the image forming apparatus while the developing cartridge 1 is attached to the drum cartridge 2, the developing cartridge 1 is configured to perform a separation process using a driving force supplied from the image forming apparatus. The separation process is a process performed for temporality separating the developing roller 30 from the photosensitive drum 92. For example, when a monochromatic printing is performed in the image forming apparatus, the separation process is performed in each of the developing cartridges 1 corresponding to the colors other than black. However, the developing cartridge 1 corresponding to the color of black may perform the separation process.

Figure 10:
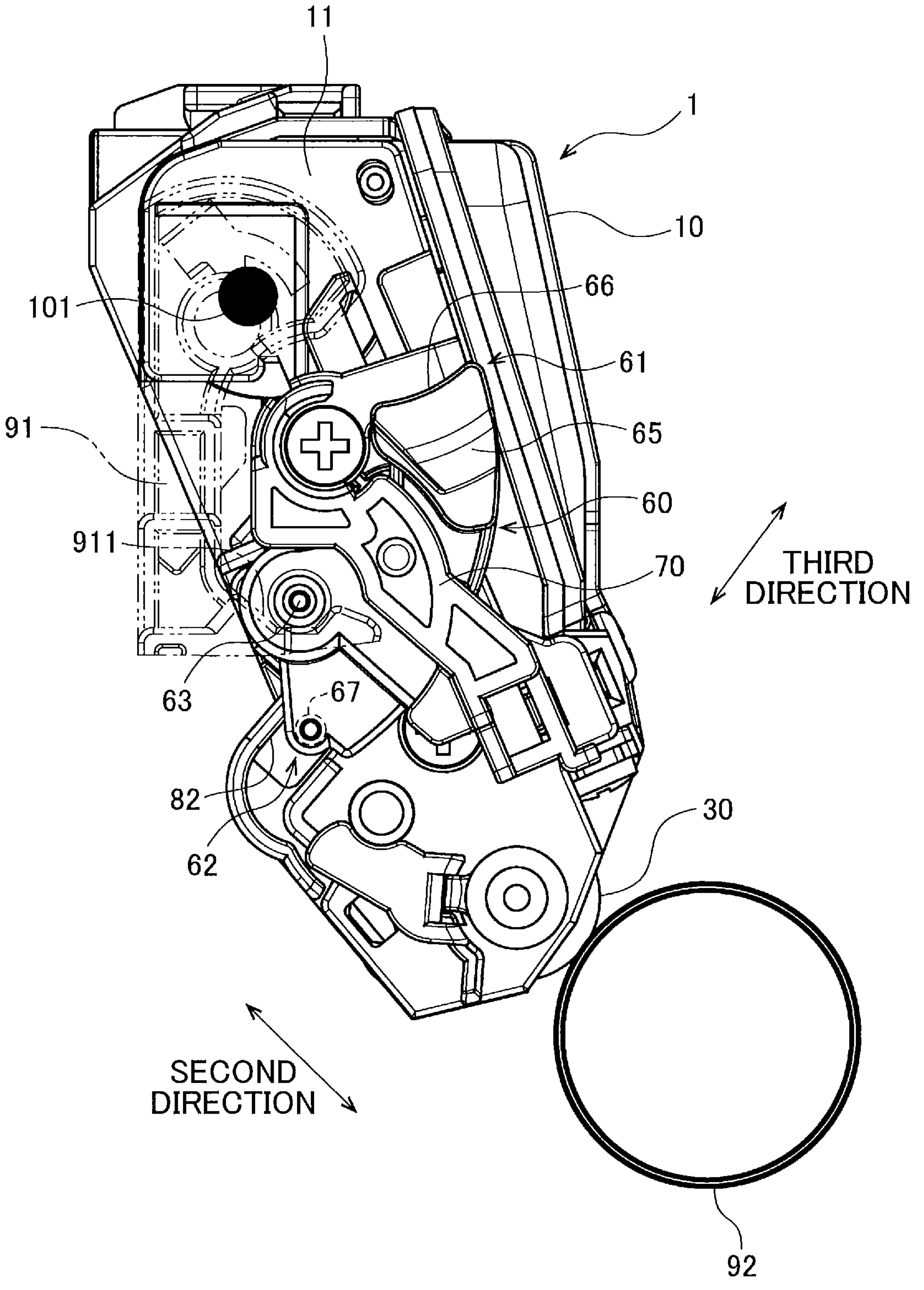
FIG. 10 is a view of the developing cartridge and a photosensitive drum of the drum cartridge as viewed in the first direction, and illustrating a state where a separation process is not performed.
Figure 11:
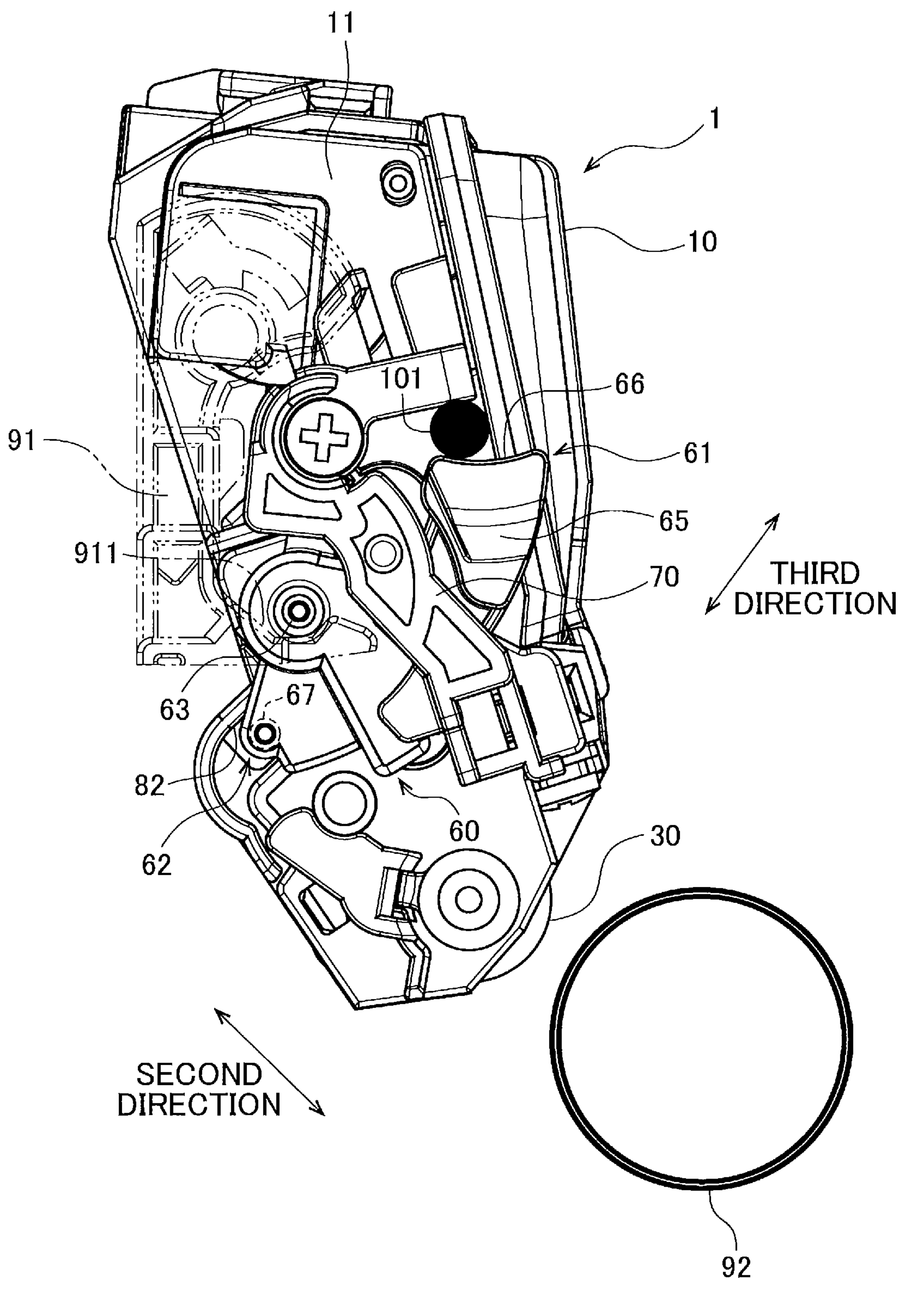
FIG. 11 is a view of the developing cartridge and the photosensitive drum as viewed in the first direction, and illustrating a state where the separation process is performed.

FIG. 10 is a view of the developing cartridge 1 and the photosensitive drum 92 as viewed in the first direction in which the separation process is not performed. FIG. 11 is a view of the developing cartridge 1 and the photosensitive drum 92 as viewed in the developing cartridge 1 in which the separation process is performed. Note that a part of the drum frame 91 is depicted with two-dotted chain line in FIGS. 10 and 11.

When the developing cartridge 1 is attached to the drum cartridge 2, the casing 10 of the developing cartridge 1 is positioned at a pressure position in which the developing roller 30 makes contact with the photosensitive drum 92 as illustrated in FIG. 10. At this time, the first lever 60 is at the first position. At the first position of the first lever 60, since the other end portion 62 of the first lever 60 is in separation from the pressure-receiving surface 82, the other end portion 62 does not press the pressure-receiving surface 82. Further, the shaft 63 of the first lever 60 is in contact with the recessed portion 911 of the drum frame 91.

When the separation process is performed in the image forming apparatus, the one end portion 61 of the first lever 60 receives a driving force from the image forming apparatus. In the meantime, as illustrated in FIGS. 10 and 11, the image forming apparatus includes a main body cam 101. The main body cam 101 is movable in the second direction between a third position (a position illustrated in FIG. 10) and a fourth position (a position illustrated in FIG. 11) relative to a frame of the image forming apparatus. When the separation process is performed, the image forming apparatus causes the main body cam 101 to move from the third position to the fourth position.

When the main body cam 101 is at the third position in a state where the drum cartridge 2 to which the developing cartridge 1 is attached is attached to the image forming apparatus, the main body cam 101 does not make contact with the first lever 60. On the other hand, when the main body cam 101 is at the fourth position in the state where the drum cartridge 2 to which the developing cartridge 1 is attached is attached to the image forming apparatus, the main body cam 101 makes contact with the one end portion 61 of the first lever 60. Specifically, the main body cam 101 makes contact with the recessed surface 66 of the first lever 60. Accordingly, the main body cam 101 presses the one end portion 61 of the first lever 60 in the second direction toward the photosensitive drum 92.

Due to a pressing force applied from the main body cam 101, the first lever 60 pivotally moves from the first position to the second position about the shaft 63 supported by the recessed portion 911, thereby causing the other end portion 62 to make contact with the pressure-receiving surface 82 of the casing 10. Therefore, the pressure-receiving surface 82 is pressed by the other end portion 62 in the second direction and in a direction away from the photosensitive drum 92. As a result, the first outer surface 11 of the casing 10 moves relative to the first lever 60 in the second direction and in the direction away from the photosensitive drum 92.

The developing cartridge 1 further includes a second lever (not illustrated). The second lever is positioned at the second outer surface 12 of the casing 10. When the separation process is performed, the image forming apparatus applies a driving force to the second lever directly or indirectly through a component of the drum cartridge 2, whereby the second lever is pressed in the second direction and in a direction away from the photosensitive drum 92. Accordingly, the second outer surface 12 of the casing 10 move in the second direction and in the direction away from the photosensitive drum 92.

As described above, at the first outer surface 11 of the casing 10, the first lever 60 is pressed by the main body cam 101 to press the casing 10 in a direction away from the photosensitive drum 92. Similarly, at the second outer surface 12 of the casing 10, the second lever is pressed in a direction away from the photosensitive drum 92. Through these operations, the casing 10 moves in the second direction from the pressure position in which the developing roller 30 makes contact with the photosensitive drum 92 (the position illustrated in FIG. 10) to a separation position in which the developing roller 30 is in separation from the photosensitive drum 92 (a position illustrated in FIG. 11).

Figure 12:
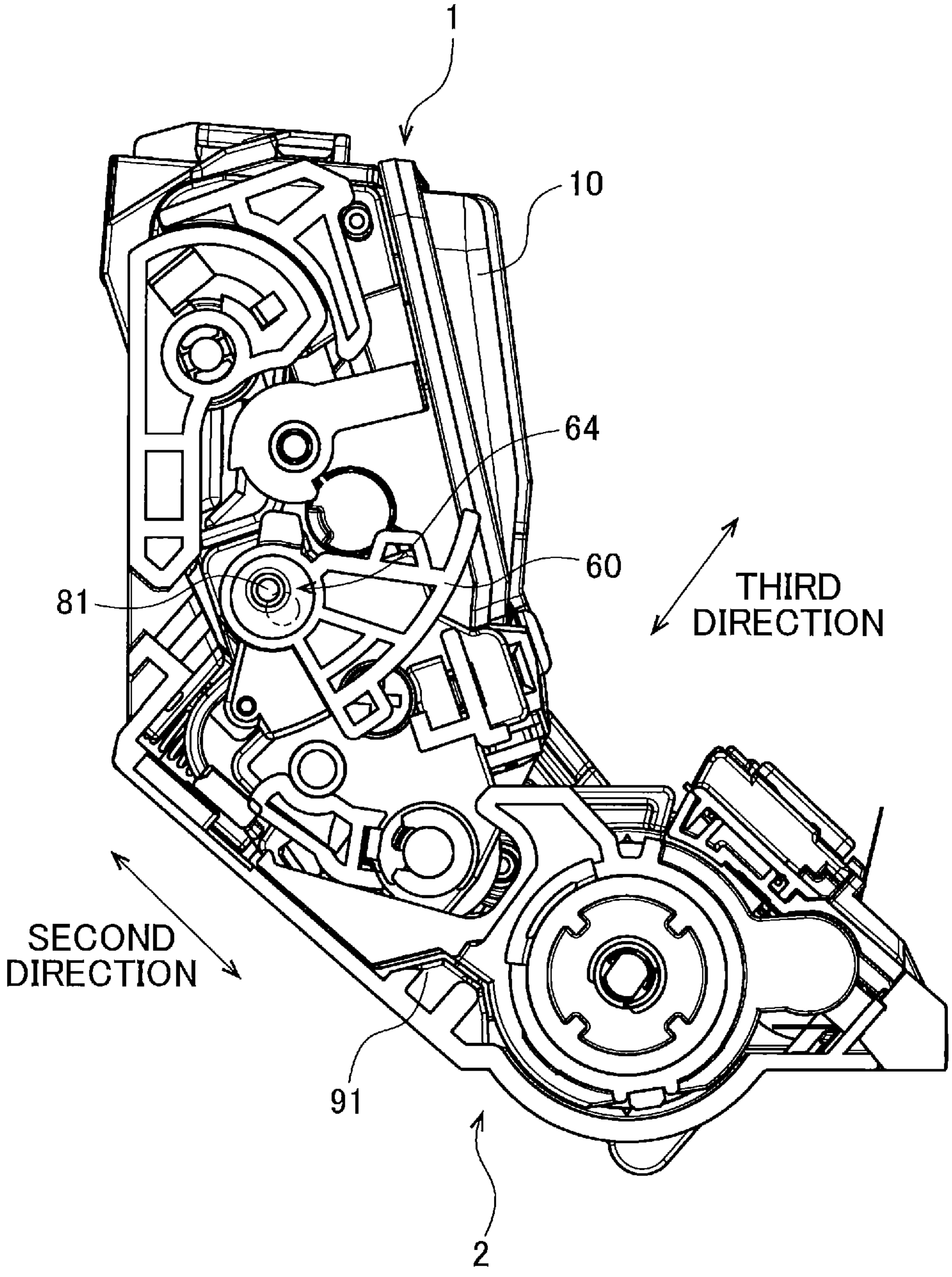
FIG. 12 is a cross-sectional view of the developing cartridge and the photosensitive drum, and illustrating the state where the separation process is performed.

FIG. 12 is a perspective view of the developing cartridge 1 and the drum cartridge 2 in which the separation process is performed taken along a plane perpendicular to the first direction. In FIG. 12, a position of the boss 81 when the separation process is not performed is depicted with a two-dotted chain line.

The first hole 64 of the first lever 60 overlaps the shaft 63 in the first direction. The shaft 63 serves as a fulcrum during the pivotal movement of the first lever 60. Accordingly, a position of the first hole 64 relative to the drum frame 91 does not change hardly even when the first lever 60 pivotally moves about the shaft 63 from the first position to the second position. That is, in both cases before the separation process is performed and after the separation process is performed, the position of the first hole 64 relative to the drum frame 91 does not change hardly.

On the other hand, because the boss 81 moves together with the casing 10, a position of the boss 81 relative to the drum frame 91 changes in the second direction. That is, the boss 81 moves in the second direction within the first hole 64 from a position indicated by the two-dotted chain line to a position indicated by a solid line in FIG. 12.

However, a difference in the dimensions in the second direction between the first hole 64 and the boss 81 is greater than a distance by which the casing 10 moves in the second direction in the separation process. Accordingly, in both cases before the separation process is performed and after the separation process is performed, the boss 81 does not make contact with the first lever 60, thereby enabling the casing 10 to move from the pressure position toward the separation position without hindrance by the first lever 60.

<6. Modifications>

While the description has been made with reference to the embodiment, it would be apparent to those skilled in the art that the present disclosure is not limited to the above embodiment and various changes and modifications may be made to the embodiment.

In the above-described embodiment, the boss 81 extends from the bearing 80. However, the boss 81 may extend from the first outer surface 11 of the casing 10.

Further, in the above-described embodiment, the developing cartridge 1 is attachable to the drum cartridge 2 including one photosensitive drum 92. However, the developing cartridge may be attachable to a drum cartridge including a plurality of photosensitive drums. Alternatively, the developing cartridge may be attachable directly to an image forming apparatus.

Further, the detailed shape of the developing cartridge 1 may be different from that illustrated in the drawings. Further, parts and components appearing in the above-described embodiment and modifications may be suitably combined together as long as any conflicting combination is avoided.

What is claimed is:

1. A developing cartridge comprising:
- a casing configured to accommodate developing agent therein;
- a developing roller;
- a boss movable together with the casing; and
- a first lever movable relative to the casing, the first lever including:
  - one end portion which is one end portion of the first lever;
  - a shaft; and
  - a first hole into which the boss is fitted,
- wherein, according to the movement of the one end portion, the first lever is pivotally movable about the shaft,
- wherein a dimension of the first hole is greater than a dimension of the boss, and
- wherein, in a case where the casing moves relative to the first lever, the boss moves within the first hole.

2. The developing cartridge according to claim 1,
- wherein the developing roller includes a developing roller shaft,
- the developing cartridge further comprising a bearing supporting one end of the developing roller shaft,
- wherein the boss extends from the bearing.

3. The developing cartridge according to claim 2,
- wherein each of the developing roller shaft and the bearing has an electrical conductivity, and
- wherein the bearing makes contact with the one end of the developing roller shaft.

4. The developing cartridge according to claim 1,
- wherein the developing roller is positioned at one end in a direction of the casing,
- wherein the first lever further includes another end portion which is another end portion of the first lever,
- wherein the developing cartridge is for use with a drum cartridge,
- the drum cartridge including:
  - a photosensitive drum; and
  - a drum frame to which the developing cartridge is attachable, and
- wherein, when the one end portion receives a driving force in a state where the developing cartridge is attached to the drum cartridge, the first lever pivotally moves about the shaft and the another end portion presses the casing such that the casing moves relative to the first lever in the direction and in another direction away from the photosensitive drum.

5. The developing cartridge according to claim 4,
- wherein a difference in the dimensions in the direction of the first hole and the boss is greater than a first distance, the first distance being indicative of a distance by which the casing moves relative to the first lever in the direction and in the another direction away from the photosensitive drum.

6. The developing cartridge according to claim 4,
- wherein the drum frame includes:
  - a recessed portion with which the shaft makes contact in a case where the developing cartridge is attached to the drum frame; and
  - a guide surface configured to guide the shaft toward the recessed portion in a process of attachment of the developing cartridge to the drum frame.

7. The developing cartridge according to claim 4,
- wherein the drum frame includes a recessed portion with which the shaft makes contact in a case where the developing cartridge is attached to the drum frame,
- wherein the first lever includes a protrusion,
- wherein the casing has a pressing surface configured to press the protrusion in a process of attachment of the developing cartridge to the drum frame, and
- wherein, by the pressing surface pressing the protrusion, the shaft moves toward the recessed portion.

8. The developing cartridge according to claim 7,
- wherein the casing pivotally moves about the developing roller in contact with the photosensitive drum in the process of attachment of the developing cartridge to the drum frame, and
- wherein pivotal movement of the casing causes the pressing surface to press the protrusion toward the recessed portion.

* * * * *